May 17, 1938.  T. B. GILLIAM  2,117,658

ICE MAKING METHOD AND APPARATUS

Filed Jan. 28, 1937  3 Sheets-Sheet 2

Inventor
T. B. Gilliam

By Seymour, Bright & Nottingham
Attorneys

May 17, 1938.  T. B. GILLIAM  2,117,658
ICE MAKING METHOD AND APPARATUS
Filed Jan. 28, 1937  3 Sheets-Sheet 3
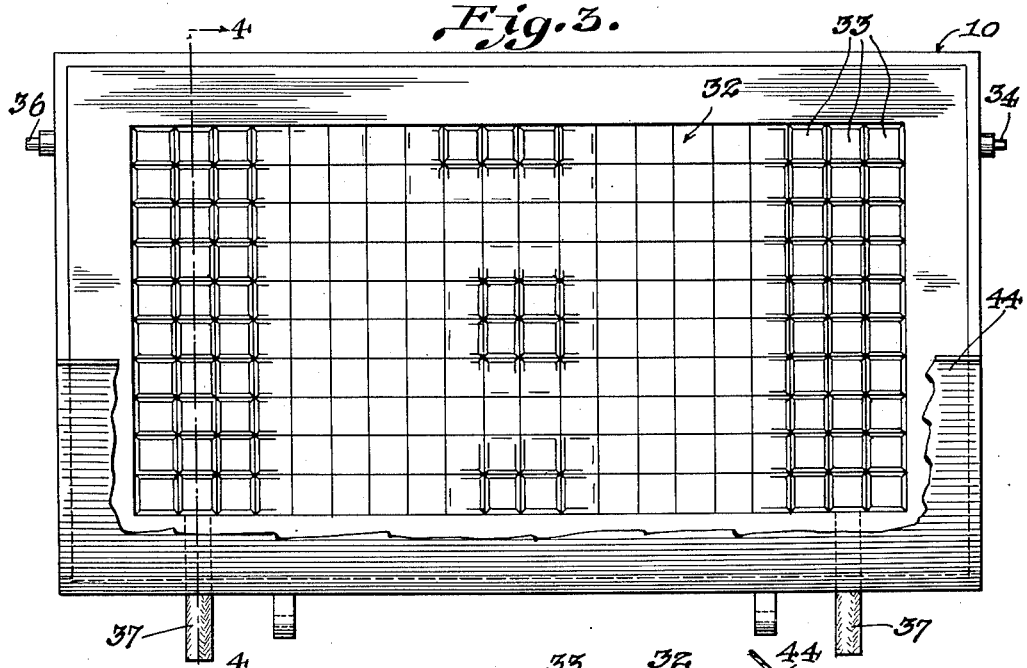
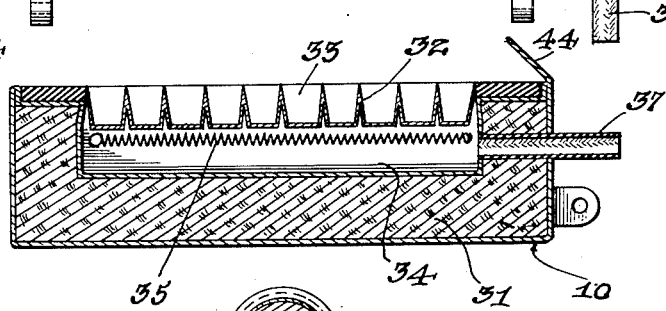
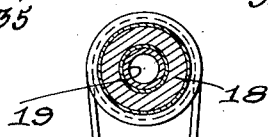
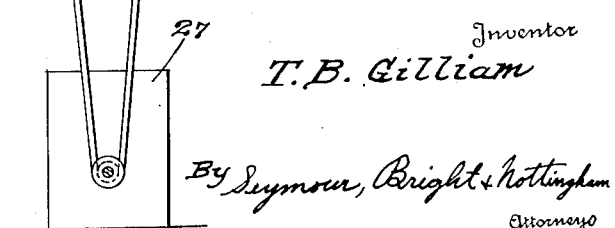
Inventor
T. B. Gilliam
By Seymour, Bright & Nottingham
Attorneys Patented May 17, 1938

2,117,658

UNITED STATES PATENT OFFICE 2,117,658

ICE MAKING METHOD AND APPARATUS

Thomas B. Gilliam, Miami, Fla.

Application January 28, 1937, Serial No. 122,873

22 Claims. (Cl. 62—105)

This invention relates to improvements in refrigerating methods and apparatus and more particularly to a novel machine designed especially for the manufacture of ice cubes.

The primary purpose of the invention is to provide an apparatus adapted to automatically manufacture clear ice cubes by a continuous freeze process.

Another object is to furnish an apparatus for such purpose provided with means for automatically thawing the cubes sufficiently in their molds to allow them to be readily discharged from the machine.

A still further object is to supply an ice cube machine of relatively simple, inexpensive and durable construction which will function automatically to produce a large number of ice cubes per hour and without employment of labor.

With the foregoing objects outlined and with other objects in view which will appear as the description proceeds, the invention consists in the novel features hereinafter described in detail, illustrated in the accompanying drawings and more particularly pointed out in the appended claims.

In the drawings:

Fig. 3 is an elevation partly broken away of one of the cube molds of the machine.

Fig. 4 is a section on the line 4—4 of Fig. 3.

Fig. 5 is a section of a detail taken on line 5—5 of Fig. 2.

Figure 1:
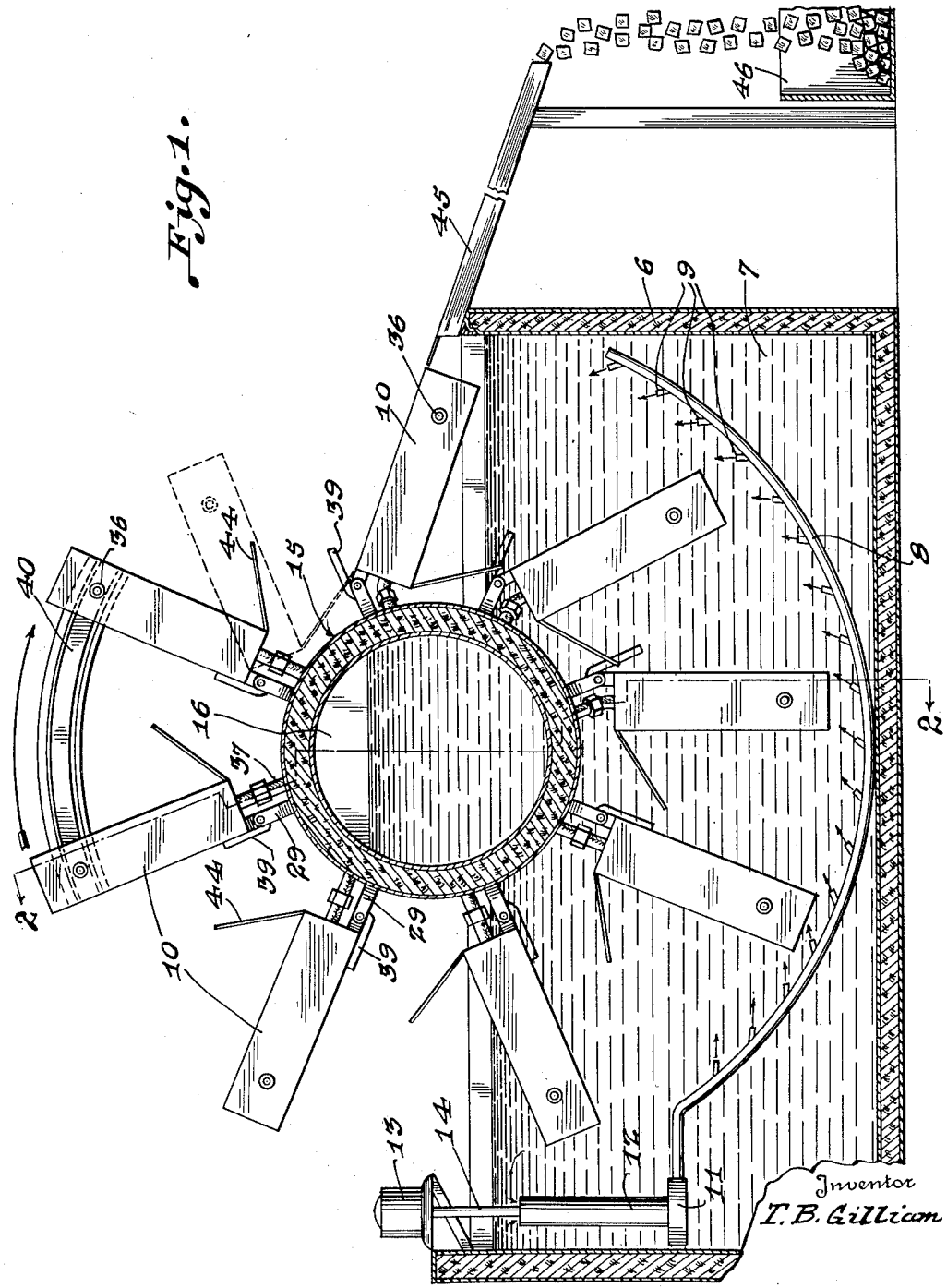
Fig. 1 is a vertical sectional view partly in elevation of one form of my apparatus.

Referring to the drawings, 6 designates a tank preferably insulated against the transfer of heat or cold and containing water or other liquid 7 to be frozen into cubes or the like. Any suitable means (not shown) may be used to keep the liquid at a certain level in the tank.

In order to keep the liquid agitated and facilitate the production of clear cubes, I arrange a small tube 8 of curved shape in the tank and provide it with small nozzles 9 for directing jets of liquid toward the cube molds 10 as they travel through the liquid. The tube forms the outlet of a rotary pump 11, provided with an inlet pipe 12 into which the liquid flows as shown by arrows in Fig. 1. The pump may be driven by any preferred means, for example, by an electric motor 13 through the instrumentality of a rotary shaft 14.

Figure 2:
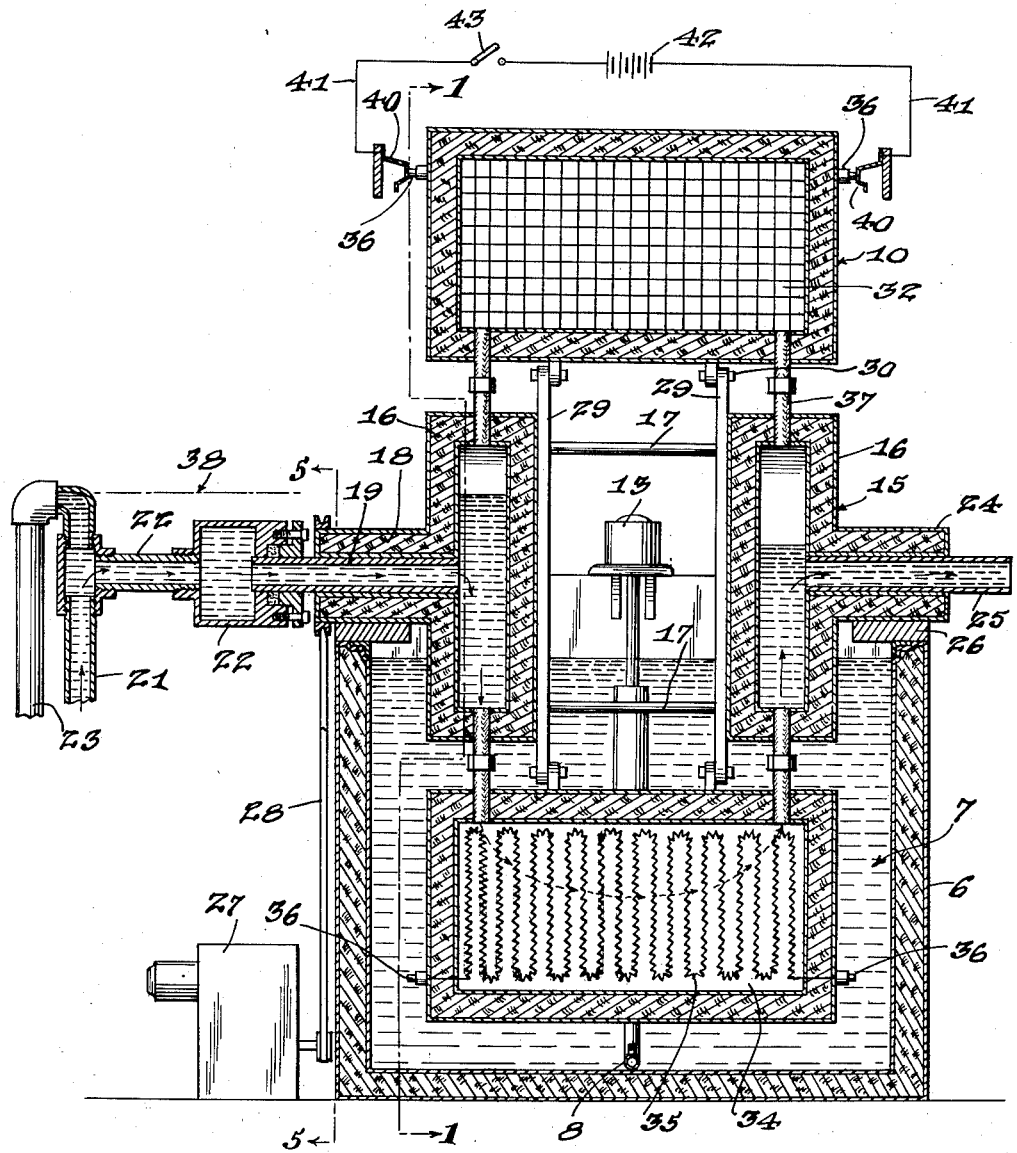
Fig. 2 is a vertical sectional view taken on the line 2—2 of Fig. 1.

A wheel or drum 15 carries the cube molds, and, as best shown in Fig. 2, the drum preferably consists of hollow discs 16 rigidly connected by bars 17. The discs are insulated against transfer of heat or cold and one of them has a hollow trunnion 18 through which extends a pipe 19 that rotates with the drum. The pipe extends into a stationary casing 20 through which brine is supplied to the pipe. Stationary conduits 21 and 22 convey brine or any other suitable refrigerating fluid to the casing 20, and an overflow pipe 23 governs the height of the refrigerant in the hollow discs 16 from which the trunnion 18 extends. The other hollow disc is provided with a tubular trunnion 24 having an outlet pipe 25 for discharging the brine from the drum.

The discs rotate on any suitable bearings 26 preferably supported by opposite sides of the tank, and the drum is rotated by any suitable means such as electric motor 27 through the medium of a belt 28.

The drum is provided with spokes or radiating rods 29 and the cube molds are hingedly connected to the spokes as shown at 30.

Each mold, as best illustrated in Figs. 3 and 4, consists of a tray 31 insulated against the transfer of heat or cold and the mouth of the tray is closed by a cellular plate 32 which forms substantially wedge shaped pockets 33 in which the water is frozen to form the cubes. The cellular member or plate 32 is formed of any suitable heat conducting material and the bottoms of the cells face a compartment or hollow chamber 34 forming part of the mold. In the chamber of each mold I arrange an electrical heating element 35, the ends of which are electrically connected to contacts 36 arranged at opposite ends of the mold.

The opposite end portions of the chamber 34 of each mold are connected respectively to the hollow discs of the drum by flexible tubes or pieces of hose 37 which permit, when a drum is below the brine level 38 (Fig. 2), the refrigerant to be circulated from one hollow disc through the chamber 34 of the mold and then through the other hollow disc, and finally out through the pipe 25.

The spokes, as shown in Fig. 1, are provided with abutment extensions 39 which act as supports for the molds during a portion of a revolution of a drum, so as to hold the molds in radial positions during a portion of the cycle.

The contacts 36 of the molds, during rotation of the drum, come into engagement with arc-shaped stationary contacts 40 to which current is supplied by wiring 41 connected to an electric battery 42. A hand switch 43 is preferably placed in the circuit so as to prevent the loss of current in case the drum should be idle and the contacts 36 of one or more of the molds should be in engagement with the stationary contacts 40.

Each mold is provided with a cube guide plate 44 which is fixed to the pocket side of the mold and projects outwardly at an angle to the face thereof. As the drum turns in a clockwise direction (Fig. 1), each mold, as it passes over the dead center at the top of the drum, tips forward on its hinge connection and this causes the guide plate to strike the preceding mold, with the result that the cubes drop out of the pockets of the tipped mold, and slide outwardly on to the bottom of the preceding mold, from which they continue to travel over a stationary inclined guide plate 45 which deposits them in a receptacle 46.

In operation, it will be assumed that the drum is revolved at a speed of two revolutions per hour with the molds at the lower side of the drum submerged in the water in the tank 6. Brine at a temperature of between 6° F. to 15° F. is pumped into the pipe 21 and thence through the drum and the lower molds, and the arrangement is such that the drum is carried about three-quarters full of brine, which allows the refrigerant to flow through the chambers 34 of the molds on the lower half of the wheel. The cold brine in the lower molds causes ice to be formed in the cube pockets 33, and while this is going on the pump 11 sprays water at high velocity against the cube pockets through the nozzles 9 and causes the ice to freeze clear.

When a mold reaches a position above the brine level, the refrigerant is discharged from its compartment 34 through the hose 37 and the freezing process ceases on this particular mold. When the contacts 36 of a drained mold reach the brushes 40, the heating element of that mold will be heated to thaw the ice loose from the mold. Then as the mold passes a plane perpendicular to the bottom of the tank, the mold will fall forward (shown in dotted lines in Fig. 1), and this will bring its guide plate 44 into engagement with the back of the preceding mold with the result that the cubes will fall out and be discharged in the manner illustrated in Fig. 1.

As the drum revolves and an empty mold passes below the brine level, brine will flow through the same and through the hose 37 and this starts another freezing and harvesting cycle.

A mold is harvested about every 3.7 minutes, and as the process is continuous, each mold makes about 960 pounds of clear ice cubes per day. The machine will make about 3.8 tons of cubes per day.

No labor is required in the operation of my apparatus, as I employ a time clock stopping device (not shown) to regulate automatically the time of operation. As its capacity is 329 cubes per hour, I can set the clock for five hours' operation if 1600 pounds of cubes are wanted, etc.

Power and water are the only operating expenses connected with the machine. Its almost perfect heat balance—freedom from excessive auxiliary power—small investment in machines and buildings, make the apparatus extremely economical, and of course, the machine can be built in units of any size.

While the molds are shaped to make ice cubes, it is manifest that they may be shaped to freeze water into an article or articles of any desired shape or size.

While I have disclosed what I now consider to be a preferred embodiment of the invention in such manner that the same may be readily understood by those skilled in the art, I am aware that changes may be made in the details disclosed without departing from the spirit of the invention as expressed in the claims.

What I claim and desire to secure by Letters Patent is:

1. In an apparatus of the character described, means containing a liquid to be frozen, a hollow mold, means for moving said mold into and out of the liquid, means for passing a refrigerant through the mold while the latter is submerged in the liquid and for discharging the refrigerant from the mold when it is in a position above the level of said liquid, and means for heating the interior of the mold when it is in a position above the liquid level for thawing a frozen article from the mold.

2. In an apparatus for manufacturing ice cubes or the like, means containing a liquid to be frozen, a hollow mold, means for moving said mold into and out of the liquid, and means for passing a refrigerant through the mold while the latter is submerged in the liquid and for discharging the refrigerant from the mold when it is in a position above the level of said liquid, said mold having a pocket in which an article is frozen by the refrigerant as the mold is submerged in the liquid.

3. In an apparatus of the character described, means containing a liquid to be frozen, a hollow mold, means for moving said mold into and out of the liquid, means for passing a refrigerant through the mold while the latter is submerged in the liquid and for discharging the refrigerant from the mold when it is in a position above the level of said liquid, and an electric heater arranged in the mold for thawing a frozen article loose from the mold while the latter is above the liquid level.

4. An apparatus for manufacturing ice cubes or the like comprising means containing a liquid to be frozen, a series of hollow molds, means carrying said molds and arranged to move the molds in series into and out of the liquid, and means for passing a refrigerant fluid through the molds while they are submerged and for discharging the refrigerant from the molds when they are above the liquid level.

5. An apparatus of the character described comprising means containing a liquid to be frozen, a series of hollow molds, means carrying said molds and arranged to move the molds in series into and out of the liquid, means for passing a refrigerant fluid through the molds while they are submerged and for discharging the refrigerant from the molds when they are above the liquid level, and means for heating the interior of the molds when they are in a position above the liquid level.

6. An apparatus for manufacturing ice cubes or the like comprising means containing a liquid to be frozen, a series of hollow molds, means carrying said molds and arranged to move the molds in series into and out of the liquid, means for passing a refrigerant fluid through the molds while they are submerged and for discharging the refrigerant from the molds when they are above the liquid level, and means for discharging a frozen article from a mold when the latter is in a position above the liquid level.

7. An apparatus of the character described comprising means containing a liquid to be frozen, a movable carrier, a series of molds hingedly connected to the carrier and adapted to be moved by the latter into and out of said liquid, each mold being provided with an internal compartment, means for introducing a refrigerant fluid into the compartment of each mold while the latter is submerged in the liquid and for discharging the refrigerant fluid from the compartment when the mold is in a position above the liquid level.

8. An apparatus of the character described comprising means containing a liquid to be frozen, a movable carrier, a series of molds hingedly connected to the carrier and adapted to be moved by the latter into and out of said liquid, each mold being provided with an internal compartment, means for introducing a refrigerant fluid into the compartment of each mold while the latter is submerged in the liquid and for discharging the refrigerant fluid from the compartment when the mold is in a position above the liquid level, said carrier comprising a hollow rotatable drum through which the refrigerant fluid is passed to and from the compartments of the molds.

9. An apparatus of the character described comprising means containing a liquid to be frozen, a movable carrier, a series of molds hingedly connected to the carrier and adapted to be moved by the latter into and out of said liquid, each mold being provided with an internal compartment, means for introducing a refrigerant fluid into the compartment of each mold while the latter is submerged in the liquid and for discharging the refrigerant fluid from the compartment when the mold is in a position above the liquid level, said carrier including a drum consisting of rigidly connected hollow discs through which the refrigerant fluid is passed to and from the compartments of the molds.

10. An apparatus of the character described comprising means containing a liquid to be frozen, a movable carrier, a series of molds hingedly connected to the carrier and adapted to be moved by the latter into and out of said liquid, each mold being provided with an internal compartment, means for introducing a refrigerant fluid into the compartment of each mold while the latter is submerged in the liquid and for discharging the refrigerant fluid from the compartment when the mold is in a position above the liquid level, said carrier consisting of a hollow drum through which the refrigerant fluid is passed to and from the compartments of the molds, said drum having a hollow trunnion, and stationary means for conveying a refrigerant fluid to said trunnion.

11. An apparatus of the character described comprising means containing a liquid to be frozen, a movable carrier, a series of molds hingedly connected to the carrier and adapted to be moved by the latter into and out of said liquid, each mold being provided with an internal compartment, means for introducing a refrigerant fluid into the compartment of each mold while the latter is submerged in the liquid and for discharging the refrigerant fluid from the compartment when the mold is in a position above the liquid level, an electrical heating element arranged in each mold, and means for passing an electric current through each heating element while the mold is in a position above the liquid level.

12. An apparatus of the character described comprising means containing a liquid to be frozen, a movable carrier, a series of molds hingedly connected to the carrier and adapted to be moved by the latter into and out of said liquid, each mold being provided with an internal compartment, means for introducing a refrigerant fluid into the compartment of each mold while the latter is submerged in the liquid and for discharging the refrigerant fluid from the compartment when the mold is in a position above the liquid level, and means for maintaining the molds in radiating positions relatively to a horizontal axis while the molds are moved by said carrier at one side of a vertical plane coinciding with said axis.

13. An apparatus of the character described comprising means containing a liquid to be frozen, a hollow rotatable drum, hollow molds arranged in the periphery of the drum and hingedly connected to the latter, the drum being positioned to move the molds into and out of the liquid as the drum rotates, fluid-conducting means placing the interior of the molds in communication with the interior of the drum, and means for introducing a refrigerant fluid into the drum and for discharging said fluid from the drum.

14. An apparatus of the character described comprising means containing a liquid to be frozen, a hollow rotatable drum, hollow molds arranged in the periphery of the drum and hingedly connected to the latter, the drum being positioned to move the molds into and out of the liquid as the drum rotates, fluid-conducting means placing the interior of the molds in communication with the interior of the drum, and means for introducing a refrigerant fluid into the drum and for discharging said fluid from the drum, each mold having pockets and an ice cube guide for guiding cubes discharged from its pockets.

15. An apparatus of the character described comprising means containing a liquid to be frozen, a hollow rotatable drum, hollow molds arranged in the periphery of the drum and hingedly connected to the latter, the drum being positioned to move the molds into and out of the liquid as the drum rotates, fluid-conducting means placing the interior of the molds in communication with the interior of the drum, and means for introducing a refrigerant fluid into the drum and for discharging said fluid from the drum, an electric heating element arranged in each mold and having contacts projecting from the mold, stationary contacts arranged to engage the contacts of the heating element while the mold is above the liquid level, a source of electric current, and means for conveying the current between the source and the stationary contacts.

16. A continuous method of making ice cubes or the like comprising passing a hollow mold having an external pocket into and out of a liquid which is to be frozen in the pocket, passing a refrigerant fluid through the mold while the latter is submerged in the liquid, and discharging the refrigerant from the mold when the latter is in a position above the level of the liquid.

17. A continuous method of making ice cubes or the like comprising moving a series of hollow molds successively into and out of a liquid to be frozen in the molds, passing a refrigerant fluid through the molds while they are submerged in the liquid, discharging the refrigerant fluid from the molds while they are out of the liquid, and subsequently discharging said articles from the molds.

18. An apparatus of the character described, comprising means containing a liquid to be frozen, a movable carrier, a series of molds movably connected to the carrier and adapted to be moved by the latter into and out of said liquid, each mold being provided with an internal compartment, means for passing a refrigerant fluid through the compartment of each mold while the latter is submerged in the liquid and for discharging the refrigerant fluid from the compartment when the mold is in a position above the liquid level.

19. An apparatus of the character described, comprising means containing a liquid to be frozen, a movable carrier, a series of molds movably connected to the carrier and adapted to be moved by the latter into and out of said liquid, each mold being provided with an internal compartment, means for passing a refrigerant fluid through the compartment of each mold while the latter is submerged in the liquid and for discharging the refrigerant fluid from the compartment when the mold is in a position above the liquid level, and means for heating each of said compartments when the mold is in a position above the liquid level for thawing articles from the molds.

20. An apparatus for manufacturing ice cubes or the like, comprising a turnable drum, hollow molds arranged at the periphery of the drum and operatively connected to the latter, means containing a liquid to be frozen in the mold, said drum being arranged to move the molds into and out of the liquid, and means for passing a refrigerant through the molds while the latter are submerged in the liquid and for discharging the refrigerant from the molds when they are in a position above the level of said liquid.

21. An apparatus for manufacturing ice cubes or the like, comprising a hollow drum rotatable about a substantially horizontal axis, means containing a pool of liquid, hollow molds arranged at the periphery of the drum and operatively connected to the latter for movement relatively to the drum while the drum is rotating, said drum being adapted to move the molds into and out of said liquid, means for introducing a refrigerant fluid into the drum and for discharging the fluid from the drum, and fluid conveying means for passing the refrigerant fluid through the interior of the molds while the latter are submerged in said liquid.

22. In an apparatus for the manufacture of ice cubes or the like, means containing a liquid to be frozen, a hollow mold, means for moving said mold into and out of the liquid, said mold being flexibly connected to the last mentioned means for movement relatively thereto while the latter is moving, and means for passing a refrigerant through the mold while the latter is submerged in the liquid and for discharging the refrigerant from the mold when it is in the position above the level of said liquid.

THOMAS B. GILLIAM.